United States Patent
Kimba Dit Adamou

(10) Patent No.: US 11,576,104 B2
(45) Date of Patent: Feb. 7, 2023

(54) NEIGHBORING RELATIONSHIP ESTABLISHMENT METHOD, WIRELESS RELAY AND NETWORK SIDE NODE

(71) Applicant: VIVO MOBILE COMMUNICATION CO., LTD., Guangdong (CN)

(72) Inventor: Boubacar Kimba Dit Adamou, Chang'an Dongguan (CN)

(73) Assignee: VIVO MOBILE COMMUNICATION CO., LTD., Chang'an (CN)

( * ) Notice: Subject to any disclaimer, the term of this patent is extended or adjusted under 35 U.S.C. 154(b) by 0 days.

(21) Appl. No.: 16/970,312

(22) PCT Filed: Jan. 28, 2019

(86) PCT No.: PCT/CN2019/073400
§ 371 (c)(1),
(2) Date: Aug. 14, 2020

(87) PCT Pub. No.: WO2019/157940
PCT Pub. Date: Aug. 22, 2019

(65) Prior Publication Data
US 2021/0084564 A1     Mar. 18, 2021

(30) Foreign Application Priority Data
Feb. 14, 2018   (CN) .......................... 201810152162.5

(51) Int. Cl.
*H04B 7/14* (2006.01)
*H04W 40/22* (2009.01)
(Continued)

(52) U.S. Cl.
CPC .......... *H04W 40/22* (2013.01); *H04W 12/06* (2013.01); *H04W 12/08* (2013.01); *H04W 48/16* (2013.01); *H04W 76/10* (2018.02)

(58) Field of Classification Search
CPC ... H04W 84/047; H04W 92/20; H04W 24/02; H04W 88/04; H04W 48/16; H04W 40/22;
(Continued)

(56) References Cited

U.S. PATENT DOCUMENTS

| | | |
|---|---|---|
| 2005/0020220 A1 | 1/2005 | Gamou |
| 2007/0149118 A1* | 6/2007 | Kang .................. H04B 7/2606 455/11.1 |

(Continued)

FOREIGN PATENT DOCUMENTS

| | | |
|---|---|---|
| CN | 101932120 A | 12/2010 |
| CN | 102158860 A | 8/2011 |

(Continued)

OTHER PUBLICATIONS

Office Action in CN Application No. 201810152162.5 dated Sep. 27, 2020.
(Continued)

*Primary Examiner* — Shantell L Heiber
(74) *Attorney, Agent, or Firm* — Maschoff Brennan

(57) ABSTRACT

Provided are a neighboring relationship establishment method, a wireless relay and a network side node. The neighboring relationship establishment method includes: establishing a neighbor list for the first wireless relay, the neighbor list including at least one neighbor relay of the first wireless relay, the neighbor relay being a wireless relay whose signal quality detected by the first wireless relay meets a predetermined condition; and establishing an interface between the first wireless relay and the neighbor relay.

12 Claims, 4 Drawing Sheets

(51) Int. Cl.
*H04W 76/10* (2018.01)
*H04W 12/06* (2021.01)
*H04W 12/08* (2021.01)
*H04W 48/16* (2009.01)

(58) Field of Classification Search
CPC ..... H04W 76/10; H04W 16/26; H04W 84/18; H04W 84/005; H04W 84/045; H04W 12/06; H04W 12/08; H04W 40/20; H04W 40/34; H04W 28/0268; H04W 28/06; H04W 24/04; H04W 40/24; H04W 40/32; H04L 41/0853; H04L 41/12; H04L 1/08; H04L 2001/0097; H04L 45/22; H04B 7/15507; H04B 7/14; H04B 7/2606; H04B 7/15542; H04B 7/145; H04B 7/15
See application file for complete search history.

(56) References Cited

U.S. PATENT DOCUMENTS

| | | | |
|---|---|---|---|
| 2008/0151821 A1 | 6/2008 | Cho et al. | |
| 2011/0228700 A1* | 9/2011 | Mildh | H04B 7/2606 370/254 |
| 2013/0272190 A1* | 10/2013 | Du | H04W 28/16 370/315 |
| 2014/0133355 A1 | 5/2014 | Shu | |
| 2014/0204834 A1* | 7/2014 | Singh | H04W 36/03 370/315 |
| 2014/0254471 A1* | 9/2014 | Fang | H04W 84/047 370/315 |
| 2015/0085830 A1 | 3/2015 | Nozaki et al. | |
| 2017/0230784 A1* | 8/2017 | Kwon | H04W 4/80 |
| 2017/0339044 A1* | 11/2017 | Garcia Morchon | H04L 12/185 |
| 2017/0339224 A1* | 11/2017 | Condeixa | H04W 4/029 |
| 2019/0364437 A1* | 11/2019 | Kamei | H04W 48/20 |

FOREIGN PATENT DOCUMENTS

| | | |
|---|---|---|
| CN | 102970233 A | 3/2013 |
| CN | 103249116 A | 8/2013 |
| EP | 2 268 097 A2 | 12/2010 |
| JP | 2005005819 A | 1/2005 |
| WO | 2011098048 A1 | 8/2011 |
| WO | WO-2019101343 A1 * | 5/2019 ............ H04W 24/02 |

OTHER PUBLICATIONS

ISR and Written Opinion in PCT Application No. PCT/CN2019/073400.
EP Search Report in Application No. 19754808.4 dated Feb. 15, 2021.
CN Office Action in Application No. 201810152162.5 dated Feb. 5, 2021.
"Consideration on route selection" 3GPP TSG-RAN WG2 NR Ad Hoc, LG Electronics Inc., R2-1801402, Jan. 22, 2018.
"Discussion on IAB node discovery and selection" 3GPP TSG-RAN WG2#103bis, ZTE, R2-1814730, Oct. 8, 2018.
KR Office Action in Application No. 10-2020-7024823 dated Jan. 26, 2022.
"Deployment scenarios and use cases for Integrated Access Backhaul" 3GPP TSG-RAN WG2 NR AH1801, Ericsson, R2-1801021, Jan. 22, 2018.
"IAB Network Topology and Route Selection" 3GPP TSG-RAN WG3-AH-1801, CATT, R3-180832, Feb. 26, 2018.

* cited by examiner

NEIGHBORING RELATIONSHIP ESTABLISHMENT METHOD, WIRELESS RELAY AND NETWORK SIDE NODE

CROSS-REFERENCE TO RELATED APPLICATION

The present application is the U.S. national phase of PCT Application No.PCT/CN2019/073400 filed on Jan. 28, 2019, which claims a priority of the Chinese patent application No. 201810152162.5 filed in China on Feb. 14, 2018, which is incorporated herein by reference in its entirety.

TECHNICAL FIELD

The present disclosure relates to the field of communications technologies, in particular to a neighboring relationship establishment method, a wireless relay and a network side node.

BACKGROUND

In a $5^{th}$-Generation (5G) mobile communications system, the use of a wireless relay as a node device of a backhaul network is currently being studied. A wireless relay backhaul technology includes the use of a wireless backhaul link at a high frequency band of more than 6 GHz. For the wireless relay (Relay) backhaul technology, one or more wireless relay nodes is added between a network side node and a terminal, so as to relay a wireless signal for one or more times, i.e., usually the wireless signal can reach the terminal in a multi-hop manner.

Taking a simple two-hop relay as an example, usually a link from the network side node to the terminal is divided into two links, i.e., a link from the network side node to a relay and a link from the relay to the terminal, and this gives an opportunity to replace a link with inferior quality with two links each with superior quality, so as to acquire a higher link capacity and a better coverage.

Currently, there is no definite scheme about how to establish and maintain a neighboring relationship between nodes in the backhaul network.

SUMMARY

An object of the present disclosure is to provide a neighboring relationship establishment method, a wireless relay and a network side node, so as to rapidly recover data transmission when a backhaul path is interrupted.

In a first aspect, the present disclosure provides in an embodiment a neighboring relationship establishment method for a first wireless relay, including: establishing a neighbor list for the first wireless relay, the neighbor list including at least one neighbor relay of the first wireless relay, the neighbor relay being a wireless relay whose signal quality detected by the first wireless relay meets a predetermined condition; and establishing an interface between the first wireless relay and the neighbor relay.

In a second aspect, the present disclosure provides in an embodiment a neighboring relationship establishment method for a network side node, including: receiving, by the network side node, a first connection request message transmitted from a first wireless relay, the first connection request message carrying identification information for authenticating a relay identity of the first wireless relay; and after the relay identity of the first wireless relay has been authenticated successfully, transmitting a first connection establishment message to the first wireless relay, to establish an interface between the network side node and the first wireless relay.

In a third aspect, the present disclosure provides in an embodiment a first wireless relay, including: a neighboring relationship establishment unit used to establish a neighbor list for the first wireless relay, the neighbor list including at least one neighbor relay of the first wireless relay, the neighbor relay being a wireless relay whose signal quality detected by the first wireless relay meets a predetermined condition; and a neighboring interface establishment unit used to establish an interface between the first wireless relay and the neighbor relay.

In a fourth aspect, the present disclosure provides in an embodiment a first wireless relay, including a processor, a memory, and a computer program stored in the memory and capable of being executed by the processor. The processor is used to execute the computer program so as to implement steps of the above-mentioned neighboring relationship establishment method.

In a fifth aspect, the present disclosure provides in an embodiment a network side node, including: a first request reception unit used to receive a first connection request message transmitted from a first wireless relay, the first connection request message carrying identification information for authenticating a relay identity of the first wireless relay; and a first interface establishment unit used to, after the relay identity of the first wireless relay has been authenticated successfully, transmit a first connection establishment message to the first wireless relay, to establish an interface between the network side node and the first wireless relay.

In a sixth aspect, the present disclosure provides in an embodiment a network side node, including a processor, a memory, and a computer program stored in the memory and capable of being executed by the processor. The processor is used to execute the computer program to implement steps of the above-mentioned neighboring relationship establishment method.

In a seventh aspect, the present disclosure provides in an embodiment a computer-readable storage medium storing therein a computer program. The computer program is executed by a processor to implement steps of the above-mentioned neighboring relationship establishment method.

According to the neighboring relationship establishment method, the wireless relay and the network side node in the embodiments of the present disclosure, through establishing the neighbor list for the first wireless relay and establishing the interface between the first wireless relay and the neighbor relay, it is able to establish and maintain the neighboring relationship between the wireless relays.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
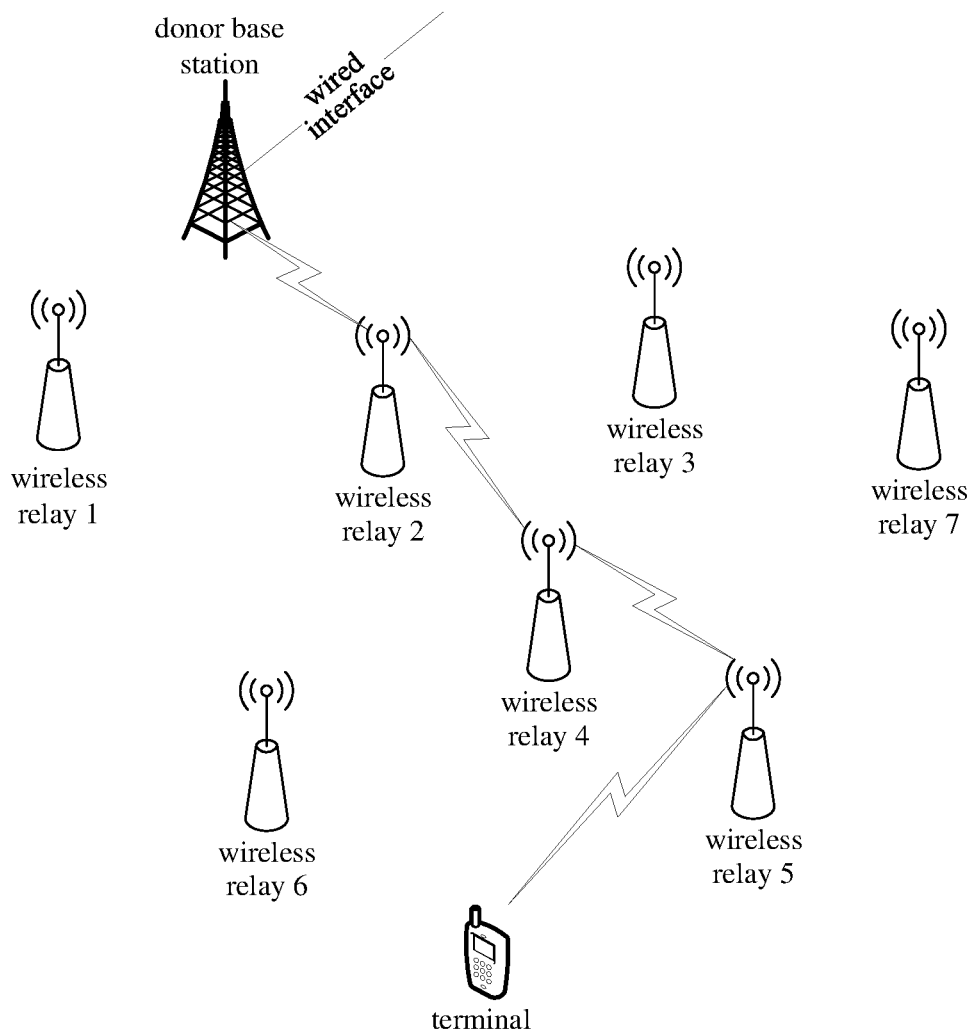
FIG. 1 is a schematic diagram showing an application scenario according to an embodiment of the present disclosure.

Hereinafter, exemplary embodiments of the present disclosure will be described in more detail with reference to the drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to a person skilled in the art.

Such words as "first" and "second" involved in the specification and the appended claims are merely used to differentiate similar objects, and do not have to be used to describe a specific order or sequence. It should be understood that the data used in this way are interchangeable under appropriate circumstances so that the embodiments of the present application described herein can be implemented in an order other than those illustrated or described herein, for example. In addition, the terms "including" and "having" and any variations thereof are intended to cover non-exclusive inclusions, for example, processes, methods, systems, products or devices that contain a series of steps or units need not be limited to those clearly listed Those steps or units may include other steps or units that are not clearly listed or are inherent to these processes, methods, products, or devices.

In the embodiments of the present disclosure, the form of a network side node will not be particularly defined, and it may be a macro base station (Macro Base Station), a pico base station (Pico Base Station), a Node B ($3^{rd}$-Generation (3G) base station), an evolved Node B (eNB), a Femto eNB (or Home eNode B or Home eNB or HeNB), a relay, an access point, a remote radio unit (Remote Radio Unit, RRU), a remote radio head (Remote Radio Head, RRH), or a network side node in a 5G mobile communications system, e.g., a central unit (Central Unit, CU) or a distributed unit (Distributed Unit, DU) of a base station (gNB). A terminal in the embodiments of the present disclosure may be a mobile phone (or cellular phone) or another device capable of transmitting or receiving a radio signal, including a User Equipment (UE), a Personal Digital Assistant (PDA), a wireless modem, a wireless communication device, a handheld device, a laptop computer, a cordless telephone, a Wireless Local Loop (WLL) station, a customer premise equipment (Customer Premise Equipment, CPE) capable of converting a mobile communication signal into a WI-FI™ signal, a mobile smart hotspot, smart appliance, or another device capable of spontaneously communicating with a mobile communication network without manual operation.

FIG. 1 shows an example of a multi-hop wireless relay backhaul path. As shown in FIG. 1, a wireless backhaul network consists of wireless relays 1 to 7. In the embodiments of the present disclosure, usually the wireless backhaul network includes a plurality of wireless relays, parts of which may directly communicate with a network side node, and parts of which may communicate with the network side node via the other wireless relays. Based on these wireless relays, it is able to establish a backhaul path from the network side node to a terminal. In FIG. 1, the multi-hop backhaul path from the network side node (e.g., a donor base station, specifically a donor gNB) to the terminal through a wireless relay 2, a wireless relay 4 and a wireless relay 5 sequentially in that order. Taking a 5G system as an example, each wireless relay in FIG. 1 may be called as integrated access and backhaul (Integrated Access and Backhaul, IAB). The IAB may have a complete base station function, or merely have a data forwarding function similar to the base station. The network side node with wired interface connection is just the base station, which may also be called as donor Integrated Access and Backhaul (DIAB). The IAB may communicate with the DIAB via a wireless interface. Naturally, the IABs may also communicate with each other via a wireless interface. In the embodiments of the present disclosure, an IAB to which the terminal accesses and which is directly used to provide services to the terminal (UE) may be called as a serving IAB (Serving IAB, SIAB). In the above backhaul path, a prior-hop IAB of the SIAB may be called as NIAB (Next IAB).

Figure 2:
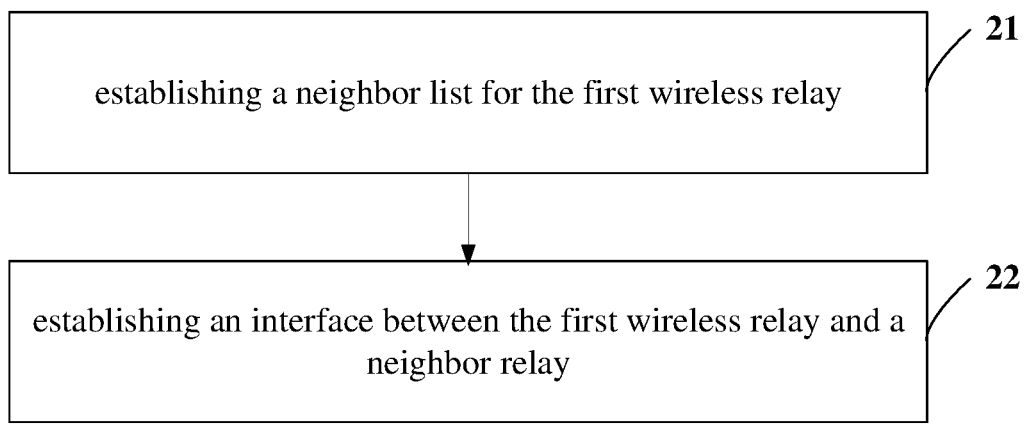
FIG. 2 is a flow chart of a neighboring relationship establishment method according to an embodiment of the present disclosure.

In the 5G system, the use of a wireless relay as a node device of a backhaul network is currently being studied, so as to create the backhaul network. Currently, there is no definite scheme about how to establish and maintain a neighboring relationship between the wireless relays. To solve this problem, the present disclosure provides in an embodiment a neighboring relationship establishment method for a first wireless relay in a backhaul network which, as shown in FIG. 2, includes the following steps.

Step 21: establishing a neighbor list for the first wireless relay, the neighbor list including at least one neighbor relay of the first wireless relay, the neighbor relay being a wireless relay whose signal quality detected by the first wireless relay meets a predetermined condition.

Here, the neighbor list may be generated by the first wireless relay in accordance with the detected signal quality of the neighboring wireless relays, i.e., the wireless relays whose signal quality meets the predetermined condition may be selected from the detected wireless relays to generate the neighbor list for the first wireless relay. In this case, the predetermined condition may be pre-configured at the first wireless relay. As a specific configuration mode, the predetermined condition may be pre-configured manually, or configuration information including the predetermined condition may be received by the first wireless relay from the network side node and then the predetermined condition may be configured locally at the first wireless relay. Further, subsequent to the generation of the neighbor list for the first wireless relay, the first wireless relay may transmit the neighbor list to the network side node.

As another implementation mode, the neighbor list may be acquired from the network side node. For example, the first wireless relay may transmit information about the detected signal quality of the neighboring wireless relays to the network side node. To be specific, the first wireless relay may transmit the information about the detected signal quality about all the wireless relays to the network side node, or merely transmit the information about the signal quality of parts of the wireless relays, e.g., the information about the signal quality of the wireless relays which meets the predetermined condition or another condition, to the network side node. Then, the network side node may generate the neighbor list for the first wireless relay in accordance with the information about the signal quality transmitted from the first wireless relay. The first wireless relay may receive the neighbor list for the first wireless relay transmitted from the network side node, so as to acquire the neighbor list.

Step 22: establishing an interface between the first wireless relay and the neighbor relay.

As mentioned above, through establishing the neighbor list for the first wireless relay and establishing the interface between the first wireless relay and the neighbor relay, it is able to maintain the neighboring relationship of the first wireless relay. Here, in the embodiments of the present disclosure, the wireless relay whose signal quality detected by the first wireless relay meets the predetermined condition may serve as the neighbor relay, so it is able to ensure the relatively reliable signal quality between the relays neighboring to each other, thereby to improve the reliability of the data transmission therebetween.

In the embodiments of the present disclosure, as an implementation mode, reference signal receiving power (Reference Signal Receiving Power, RSRP) may be used as a reference for the signal quality. For example, when the RSRP of a certain wireless relay detected by the first wireless relay is greater than a predetermined reference threshold, the wireless relay may be selected as the neighbor relay. Naturally, in the embodiments of the present disclosure, another index for the signal quality, e.g., received signal strength indication (Received Signal Strength Indication, RSSI), signal to interference ratio (Signal to Interference Ratio, SIR) and signal to interference plus noise ratio (Signal to Interference plus Noise Ratio, SINR), may also be used.

In the embodiments of the present disclosure, prior to establishing the neighbor list for the first wireless relay, the first wireless relay may join the backhaul network through establishing the interface between the first wireless relay and the network side node. For example, when the first wireless relay is starting up or initially deployed, it may receive system information transmitted from the network side node (the system information may include identification information indicating that a current node is the network side node or a relay node), so as to identify the network side node, and establish the interface between the first wireless relay and the network side node.

The establishment of the interface between the first wireless relay and the network side node will be described hereinafter.

In the embodiments of the present disclosure, the first wireless relay may transmit a first connection request message to the network side node when a signal from the network side node has been detected by the first wireless relay. The first connection request message may carry identification information for authenticating a relay identity of the first wireless relay, and the first connection request message may further carry one or more of a cell Identity (ID), a Physical Cell Identifier (PCI), a frequency and a beam index. Then, the network side node may transmit the first connection request message to a network element managing the wireless relay access, e.g., an access and mobility management (Access and Mobility Management, AMF) network element, for authentication. After the relay identity has been authenticated successfully, the network element may return information indicating that a connection request from the first wireless relay is accepted to the network side node. At this time, the network side node may transmit a first connection establishment message to the first wireless relay. The first wireless relay may receive the first connection establishment message transmitted from the network side node, and establish the interface between the first wireless relay and the network side node.

As another establishment mode, upon the receipt of a second connection establishment message forwarded by a third wireless relay, the first wireless relay may establish the interface between the first wireless relay and the network side node. Here, the third wireless relay may be a relay that has already joined the backhaul network. The second connection establishment message may be forwarded by the network side node through the third wireless relay. In this establishment mode, the interface may be established in accordance with the message forwarded by the third wireless relay between the network side node and the first wireless relay. In addition, prior to receiving the second connection establishment message, the first wireless relay may transmit a second connection request message to the third wireless relay when a signal from the third wireless relay has been detected by the first wireless relay, and the second connection request message may carry identification information for authenticating the relay identity of the first wireless relay. Similarly, the second connection request message may be forwarded to the network element managing the wireless relay access for authentication, which will not be particularly defined herein.

Apart from the establishment of the interface between the first wireless relay and the network side node to join the backhaul network, in the embodiments of the present disclosure, the first wireless relay may also join the backhaul network through establishing an interface between the first wireless relay and a second wireless relay that has already joined the backhaul network. For example, the first wireless relay may transmit a third connection request message to the second wireless relay when a signal from the second wireless relay has been detected, and the third connection request message may carry the identification information for authenticating the relay identity of the first wireless relay. The second wireless relay may forward the third connection request message to the network element managing the wireless relay access for authentication, which will not be particularly defined herein. After the relay identity has been successfully authenticated, the second wireless relay may transmit a third connection establishment message to the first wireless relay. At this time, the first wireless relay may receive the third connection establishment message, and establish the interface between the first wireless relay and the second wireless relay.

As can be seen from the above, in the embodiments of the present disclosure, in order to enable a new wireless relay to join the backhaul network, an interface between the new wireless relay and the network side node may be established directly, or an interface between the new wireless relay and another wireless relay that has already joined the backhaul network may be established.

In the embodiments of the present disclosure, the interface between the wireless relays and the interface between the wireless relay and the network side node may each be a Uu, X2, Xn, F1 or E1 interface, or another interface.

Through the above steps, it is able for the wireless relay to join the backhaul network, and it enables to establish and maintain the neighboring relationship between the wireless relays.

The establishment of the neighboring relationship will be described hereinafter from the aspect of the perspective of the network side node.

Figure 3:
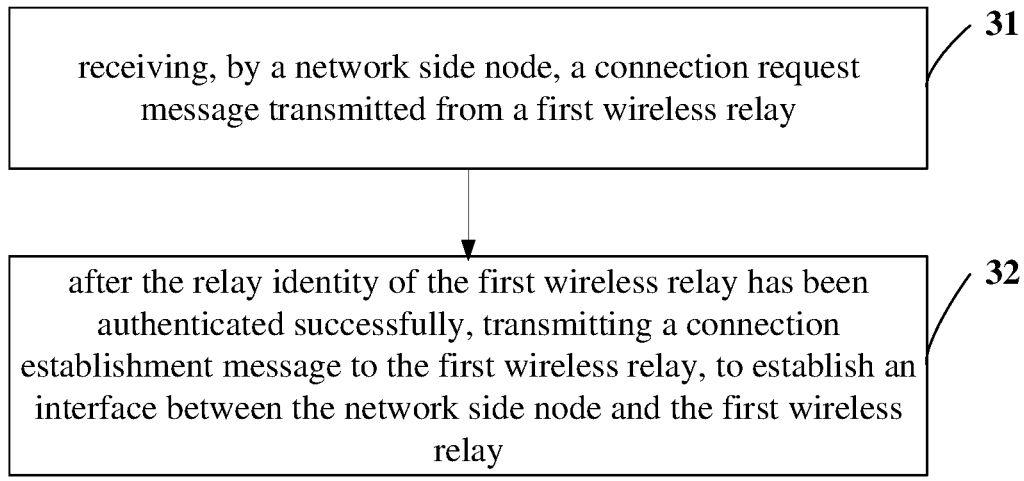
FIG. 3 is another flow chart of the neighboring relationship establishment method according to an embodiment of the present disclosure.

As shown in FIG. 3, the present disclosure further provides in an embodiment a neighboring relationship establishment method for a network side node, which includes: Step 31 of receiving, by the network side node, a connection request message transmitted from a first wireless relay, the connection request message carrying identification information for authenticating a relay identity of the first wireless relay; and Step 32 of, after the relay identity of the first wireless relay has been authenticated successfully, transmitting a connection establishment message to the first wireless relay, to establish an interface between the network side node and the first wireless relay.

Here, the network side node may transmit a first connection request message to a network element managing the wireless relay access, e.g., an AMF network element, for authentication. After the relay identity has been authenticated successfully, the network element may return information indicating that a connection request from the first wireless relay is accepted to the network side node. At this time, the network side node may transmit the connection establishment message to the first wireless relay, so as to establish the interface between the first wireless relay and the network side node.

Through the above steps, in the embodiments of the present disclosure, it is able to establish the interface between the network side node and the first wireless relay.

Subsequent to establishing the interface between the network side node and the first wireless relay, the network side node in the embodiments of the present disclosure may further receive a second connection request message forwarded by the first wireless relay, and the second connection request message may carry identification information for authenticating a relay identity of the second wireless relay. Then, the network side node may transmit the second connection request message to the network element managing the wireless relay access, e.g., the AMF network element, for authentication. After the relay identity has been authenticated successfully, the network element may return information indicating that a connection request from the second wireless relay is accepted to the network side node. At this time, the network side node may transmit a second connection establishment message to the second wireless relay via the first wireless relay to establish an interface between the network side node and the second wireless relay, or transmit an indication to the first wireless relay to indicate the establishment of an interface between the first wireless relay and the second wireless relay.

Further, subsequent to establishing the interface between the network side node and the first wireless relay, the network side node in the embodiments of the present disclosure may further receive from the first wireless relay a neighbor list for the first wireless relay. At this time, the neighbor list may be generated by the first wireless relay itself. Alternatively, the network side node may further receive information about signal quality of wireless relays detected by the first wireless relay, select wireless relays whose signal quality meets a predetermined condition from the detected wireless relays to acquire the neighbor list for the first wireless relay, and then transmit the neighbor list to the first wireless relay.

Through the above modes, the network side node in the embodiments of the present disclosure may acquire the neighbor list of the wireless relays in the backhaul network, so as to establish and maintain at least one path from the network side node to each wireless relay.

According to the embodiments of the present disclosure, it is able to establish the backhaul network including the wireless relays, and establish and maintain the neighboring relationship between the relay nodes.

The neighboring relationship establishment methods in different scenarios have been described in detail hereinabove, and corresponding devices will be described hereinafter in conjunction with the drawings.

Figure 4:
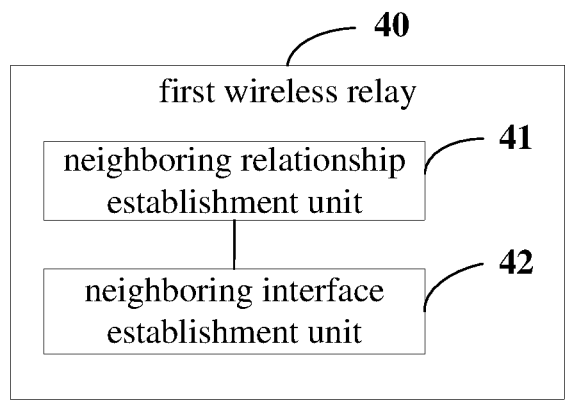
FIG. 4 is a schematic diagram showing a first wireless relay according to an embodiment of the present disclosure.

As shown in FIG. 4, the present disclosure provides in an embodiment a first wireless relay 40, which includes: a neighboring relationship establishment unit 41 used to establish a neighbor list for the first wireless relay, the neighbor list including at least one neighbor relay of the first wireless relay, the neighbor relay being a wireless relay whose signal quality detected by the first wireless relay meets a predetermined condition; and a neighboring interface establishment unit 42 used to establish an interface between the first wireless relay and the neighbor relay.

Preferably, the first wireless relay may further include a network joining unit used to establish an interface between the first wireless relay and the network side node to enable the first wireless relay to join a backhaul network, or establish an interface between the first wireless relay and a second wireless relay in the backhaul network to enable the first wireless relay to join the backhaul network.

Preferably, the network joining unit may include: a first joining unit used to transmit a first connection request message to the network side node when a signal from the network side node has been detected by the first joining unit, receive a first connection establishment message transmitted from the network side node, to establish the interface between the first wireless relay and the network side node, the first connection request message carrying identification information for authenticating a relay identity of the first wireless relay; or a second joining unit used to receive a second connection establishment message that is transmitted from the network side node and forwarded by a third wireless relay, to establish the interface between the first wireless relay and the network side node.

Preferably, the second joining unit is further used to, prior to receiving a second connection establishment message, transmit a second connection request message to the third wireless relay when a signal from the third wireless relay has been detected by the second joining unit, and the second connection request message may carry the identification information for authenticating the relay identity of the first wireless relay.

Preferably, the network joining unit is further used to receive a third connection establishment message transmitted from the second wireless relay, to establish an interface between the first wireless relay and the second wireless relay.

Preferably, the neighboring relationship establishment unit is further used to: detect information about signal quality of each wireless relay neighboring to the first wireless relay through detecting a wireless signal; and transmit the information about the signal quality of the detected wireless relay to the network side node, and receive the neighbor list for the first wireless relay from the network side node, or select wireless relays whose signal quality meets the predetermined condition from the detected wireless relays to acquire the neighbor list for the first wireless relay.

Figure 5:
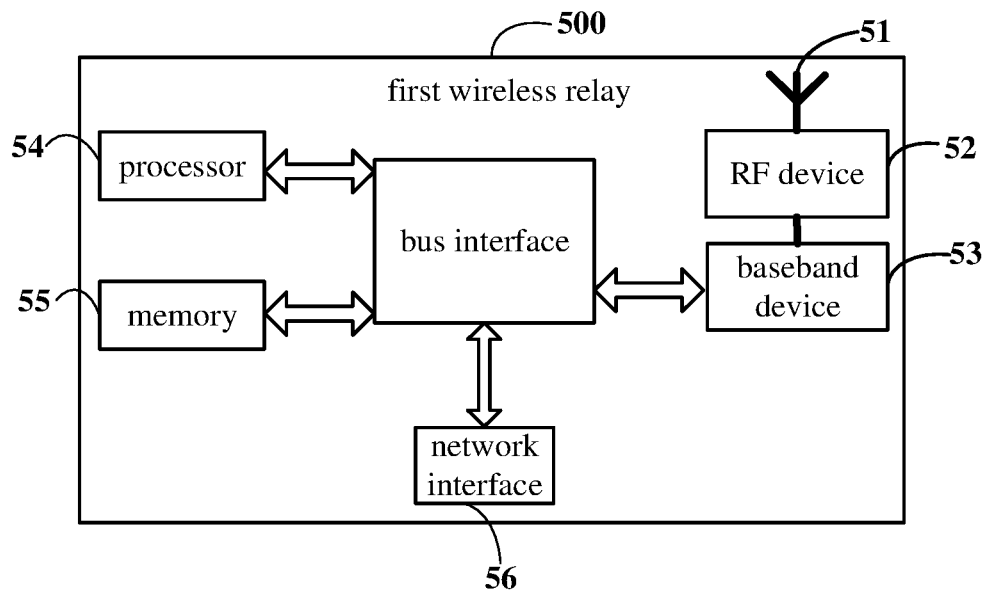
FIG. 5 is a block diagram of the first wireless relay according to an embodiment of the present disclosure.

The present disclosure further provides in an embodiment another first wireless relay. As shown in FIG. 5, the first wireless relay 500 includes an antenna 51, a Radio Frequency (RF) device 52, and a baseband device 53. The antenna 51 is connected to the radio frequency device 52. In an uplink direction, the radio frequency device 52 is used to receive information via the antenna 51, and transmit the received information to the baseband device 53 for processing. In a downlink direction, the baseband device 53 is used to process to-be-transmitted information, and transmit the processed information to the radio frequency device 52. The radio frequency device 52 is used to process the received information and transmit the processed information via the antenna 51.

A frequency band processing unit may be located within the baseband device 53, so that the above methods for the first wireless relay may be implemented within the baseband device 53. The baseband device 53 may include a processor 54 and a memory 55.

The baseband device 53 may, e.g., include at least one baseband board on which a plurality of chips is located, as shown in FIG. 5. One chip may be, e.g., the processor 54 connected to the memory 55 and used to call a program stored in the memory 55 so as to perform operations for the first wireless relay in the above-mentioned method embodiments.

The baseband device 53 may further include a network interface 56 used to exchange information with the radio frequency device 52. The network interface may be, e.g., a common public radio interface (Common Public Radio Interface, CPRI).

Here, the processor may include merely one processor, or a plurality of processing elements. For example, the processor may be a Central Processing Unit (CPU), an Application-Specific Integrated Circuit (ASIC), or one or more Integrated Circuits (ICs) configured to implement the above-mentioned methods for the first wireless relay, e.g., one or more Digital Signal Processors (DSPs), or one or more Field Programmable Gate Arrays (FPGAs). The memory may include merely one memory, or a plurality of storage elements.

The memory 55 may be a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but nonrestrictively, the RAM may be in various forms, e.g., static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 55 intends to include, but not limited to, the above-mentioned and any other appropriate memories.

To be specific, in the embodiments of the present disclosure, the first wireless relay may further include a computer program stored in the memory 55 and executed by the processor 54. The processor 54 is used to call the computer program stored in the memory 55, so as to implement the method executed by the modules in FIG. 4.

To be specific, the processor 54 is further used to call the computer program so as to: establish a neighbor list for the first wireless relay, the neighbor list including at least one neighbor relay of the first wireless relay, the neighbor relay being a wireless relay whose signal quality detected by the first wireless relay meets a predetermined condition; and establish an interface between the first wireless relay and the neighbor relay.

To be specific, the processor 54 is further used to call the computer program so as to establish an interface between the first wireless relay and the network side node, or establish an interface between the first wireless relay and a second wireless relay in a backhaul network.

To be specific, the processor 54 is further used to call the computer program so as to: transmit a first connection request message to the network side node when a signal from the network side node has been detected, receive a first connection establishment message transmitted from the network side node, and establish the interface between the first wireless relay and the network side node, the first connection request message carrying identification information for authenticating a relay identity of the first wireless relay; or receive a second connection establishment message that is transmitted from the network side node and forwarded by a third wireless relay, and establish the interface between the first wireless relay and the network side node.

To be specific, the processor 54 is further used to call the computer program so as to transmit a second connection request message to the third wireless relay when a signal from the third wireless relay has been detected, and the second connection request message may carry the identification information for authenticating the relay identity of the first wireless relay.

To be specific, the processor 54 is further used to call the computer program so as to receive a third connection establishment message transmitted from the second wireless relay, and establish an interface between the first wireless relay and the second wireless relay.

To be specific, the processor 54 is further used to call the computer program so as to: detect information about signal quality of each wireless relay neighboring to the first wireless relay through detecting a wireless signal; and transmit the information about the signal quality of the detected wireless relay to the network side node, and receive the neighbor list for the first wireless relay returned from the network side node, or select wireless relays whose signal quality meets the predetermined condition from the detected wireless relays to acquire the neighbor list for the first wireless relay.

In order to achieve the above purpose in a better manner, the present disclosure further provides in an embodiment a first wireless relay, which includes a processor, a memory, and a computer program stored in the memory and executed by a processor. The processor is used to execute the computer program so as to implement the above-mentioned neighboring relationship establishment method.

Figure 6:
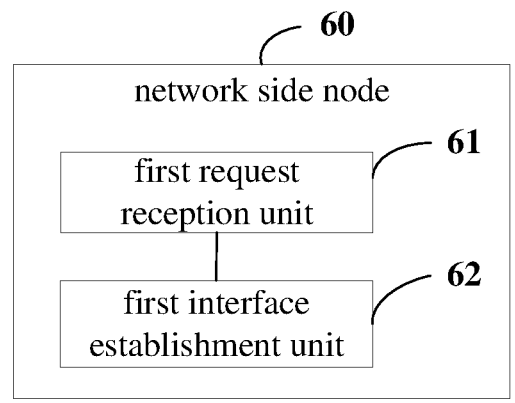
FIG. 6 is a schematic diagram showing a network side node according to an embodiment of the present disclosure.

As shown in FIG. 6, the present disclosure further provides in an embodiment a network side node 60, which includes: a first request reception unit 61 used to receive a first connection request message transmitted from a first wireless relay, the first connection request message carrying identification information for authenticating a relay identity of the first wireless relay; and a first interface establishment unit 62 used to, after the relay identity of the first wireless relay has been authenticated successfully, transmit a first connection establishment message to the first wireless relay, and establish an interface between the network side node and the first wireless relay.

Preferably, the network side node may further include: a second request reception unit used to receive a second connection request message forwarded by the first wireless relay, the second connection request message carrying identification information for authenticating a relay identity of a second wireless relay; and a second interface establishment unit used to, after the relay identity of the second wireless relay has been authenticated successfully, transmit a second connection establishment message to the second wireless relay through the first wireless relay, and establish an interface between the network side node and the second wireless relay, or indicate the first wireless relay to establish an interface between the first wireless relay and the second wireless relay.

Preferably, the network side node may further include a neighbor list acquisition unit used to: receive from the first wireless relay a neighbor list for the first wireless relay; or receive information about signal quality of wireless relays detected by the first wireless relay, select wireless relays whose signal quality meets a predetermined condition from the wireless relays detected by the first wireless relay to acquire the neighbor list for the first wireless relay, and then transmit the neighbor list to the first wireless relay.

Preferably, the network side node may further include a neighbor list maintenance unit used to establish and maintain at least one path from the network side node to each wireless relay in accordance with the neighbor list of the wireless relays.

Figure 7:
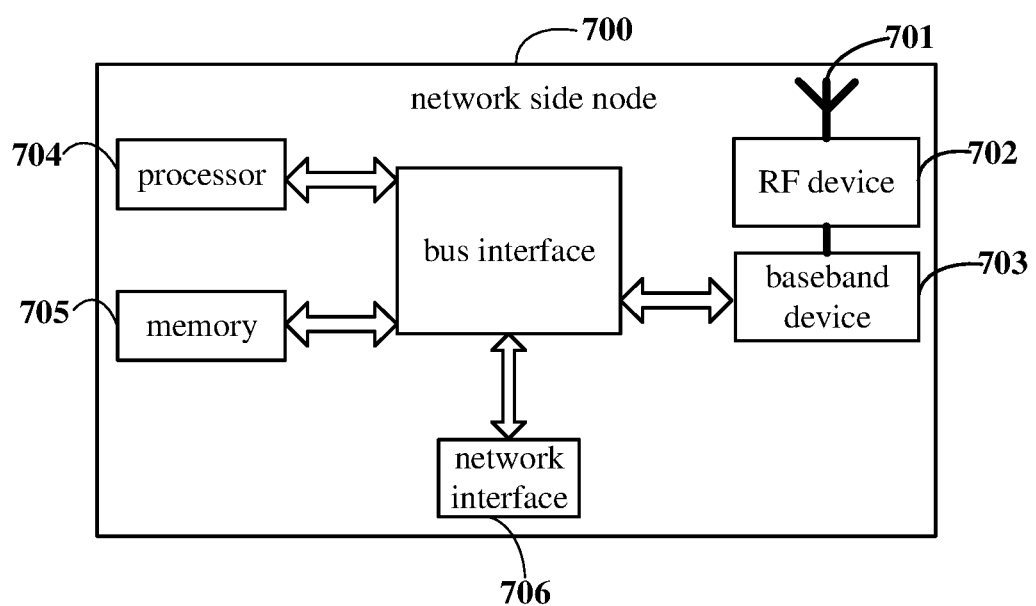
FIG. 7 is a block diagram of the network side node according to an embodiment of the present disclosure.

The present disclosure further provides in an embodiment a network side node. As shown in FIG. 7, the network side node 700 includes an antenna 71, a radio frequency device 72, and a baseband device 73. The antenna 71 is connected to the radio frequency device 72. In an uplink direction, the radio frequency device 72 is used to receive information via the antenna 71, and transmit the received information to the baseband device 73 for processing. In a downlink direction, the baseband device 73 is used to process to-be-transmitted information, and transmit the processed information to the radio frequency device 72. The radio frequency device 72 is used to process the received information and transmit the processed information via the antenna 71.

The frequency band processing device may be located within the baseband device 73, so that the above method for the network side node may be implemented within the baseband device 73. The baseband device 73 may include a processor 74 and a memory 75.

The baseband device 73 may, e.g., include at least one baseband board on which a plurality of chips is located, as shown in FIG. 7. One chip may be, e.g., the processor 74 connected to the memory 75 and used to call a program stored in the memory 75 so as to perform operations for the network side node in the above-mentioned method embodiments.

The baseband device 73 may further include a network interface 76 used to exchange information with the radio frequency device 72. The network interface may be, e.g., a common public radio interface (Common Public Radio Interface, CPRI).

Here, the processor may include merely one processor, or a plurality of processing elements. For example, the processor may be a CPU, an ASIC, or one or more ICs configured to implement the above-mentioned methods for the network side node, e.g., one or more DSPs, or one or more FPGAs. The memory may include merely one memory, or a plurality of storage elements.

The memory 75 may be a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but nonrestrictively, the RAM may be in various forms, e.g., static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 75 intends to include, but not limited to, the above-mentioned and any other appropriate memories.

To be specific, in the embodiments of the present disclosure, the network side node may further include a computer program stored in the memory 75 and executed by the processor 74. The processor 74 is used to call the computer program stored in the memory 75, so as to implement the method executed by the modules in FIG. 6.

To be specific, the processor 74 is further used to call the computer program, so as to: receive a first connection request message transmitted from a first wireless relay, the first connection request message carrying identification information for authenticating a relay identity of the first wireless relay; and after the relay identity of the first wireless relay has been authenticated successfully, transmit a first connection establishment message to the first wireless relay, and establish an interface between the network side node and the first wireless relay.

The processor 74 is further used to call the computer program, so as to: receive a second connection request message forwarded by the first wireless relay, the second connection request message carrying identification information for authenticating a relay identity of a second wireless relay; and after the relay identity of the second wireless relay has been authenticated successfully, transmit a second connection establishment message to the second wireless relay through the first wireless relay, and establish an interface between the network side node and the second wireless relay, or indicate the first wireless relay to establish an interface between the first wireless relay and the second wireless relay.

The processor 74 is further used to call the computer program, so as to: receive from the first wireless relay a neighbor list for the first wireless relay; or receive information about signal quality of wireless relays detected by the first wireless relay, select wireless relays whose signal quality meets a predetermined condition from the wireless relays detected by the first wireless relay to acquire the neighbor list for the first wireless relay, and then transmit the neighbor list to the first wireless relay.

The processor 74 is further used to call the computer program, so as to establish and maintain at least one path from the network side node to each wireless relay in accordance with the neighbor list of the wireless relays.

In order to achieve the above purpose in a better manner, the present disclosure further provides in an embodiment a network side node, which includes a processor, a memory, and a computer program stored in the memory and executed by a processor. The processor is used to execute the computer program so as to implement the above-mentioned neighboring relationship establishment method.

The present disclosure further provides in an embodiment a computer-readable storage medium storing therein a computer program. The computer program is executed by a processor so as to implement the above-mentioned neighboring relationship establishment methods. The computer-readable storage medium may be a read-only memory (Read-Only Memory, ROM), a random access memory (Random Access Memory, RAM), a magnetic disk or an optical disk.

It should be further appreciated that, the above modules of the network device and the terminal are divided merely on the basis of their logic functions, and in actual use, they may be completely or partially integrated into a physical entity, or physically separated from each other. And these modules can all be implemented in the form of software called by processing elements; or they can also be all implemented in the form of hardware; or some modules can be implemented in the form of calling software by processing elements, and some of the modules are implemented in the form of hardware. For example, the determination module may be a processing element arranged separately, or integrated into a chip of the above-mentioned device. In addition, the determination module may be stored in the memory of the above-mentioned device in the form of program codes, and the function of the determination module may be called and executed by a processing element of the above-mentioned device so as to achieve the above functions. The other modules may be implemented in a similar manner. All or parts of the modules may be integrated together or arranged separately. Here, the processing element may be an IC having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more application specific integrated circuits (Application Specific Integrated Circuits, ASICs), one or more digital signal processors (Digital Signal Processors, DSPs), or one or more field programmable gate arrays (Field Programmable Gate Arrays, FPGAs). For another example, when a certain module is implemented by calling a program code through a processing element, the processing element may be a general-purpose processor, e.g., a central processing unit (Central Processing Unit, CPU) or another processor capable of calling the program code. These modules may be integrated together and implemented in the form of system-on-a-chip (System-On-a-Chip, SOC).

It should be appreciated that, units and algorithm steps described in the embodiments of the present disclosure may be implemented in the form of electronic hardware, or a combination of a computer software and the electronic hardware. Whether these functions are performed by hardware or software depends on the specific application and design constraint conditions of the technical solution. Professionals and technicians can use different methods for each specific application to implement the described functions, but such implementation should not be considered beyond the scope of the present disclosure.

A person skilled in the art can clearly understand that, for the convenience and conciseness of description, the specific working process of the above-described system, device, and unit can refer to the corresponding process in the foregoing method embodiments, which is not repeated herein.

In the embodiments provided in this application, it should be understood that the disclosed device and method may be implemented in other ways. For example, the device embodiments described above are only schematic. For example, the division of the unit is only a logical function division, and there may be other divisions in actual implementation, for example, multiple units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units may be, or may not be, physically separated from each other. The components displayed as units may or may not be physical units, that is, they may be located in one place, or may be distributed on multiple network units. Some or all of the units may be selected according to actual needs to achieve the purpose of the solution of this embodiment.

In addition, the functional units in the various embodiments of the present disclosure may be integrated into one processing unit, or each unit may exist alone physically, or two or more units may be integrated into one unit.

In the case that the functional units are implemented in a software form and sold or used as a separate product, they may be stored in a computer-readable medium. Based on this, the technical solution of the present disclosure essentially or part of the contribution to the prior art or part of the technical solution can be embodied in the form of a software product, and the computer software product is stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), an ROM, an RAM, a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may naturally be performed in a time sequence according to the order of description, but do not necessarily need to be performed in a time sequence, and some steps can be performed in parallel or independently of each other. It should be further appreciated that, after reading the descriptions of the present disclosure, it is able for a person skilled in the art who may understand that all or any of the steps or components of the method and device of the present disclosure, using a basic programming skill, to implement any or all steps of the method and any or all members of the device in any computing device (including a processor and a storage medium) or a network consisting of the computing devices, in the form of hardware, firmware, software or a combination thereof.

Therefore, the purpose of the present disclosure can also be realized by running a program or a group of programs on any computing device. The computing device may be a well-known general-purpose device. Therefore, the purpose of the present disclosure can also be achieved only by providing a program product including program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that, in the device and method of the present disclosure, obviously, each component or each step can be decomposed and/or recombined. These decomposition and/or recombination should be regarded as equivalent solutions of the present disclosure. In addition, the steps of executing the above-mentioned series of processing can naturally be executed in time sequence in the order of description, but it is not necessarily executed in time sequence. Certain steps can be performed in parallel or independently of each other.

The above are preferred embodiments of the present disclosure, and it should be noted that a person of ordinary skills in the art can make further improvements and modifications without departing from the principle of the present disclosure, and these improvements and modifications should also be considered to fall within the protection scope of the present disclosure.

What is claimed is:

1. A neighboring relationship establishment method for a first wireless relay in a wireless backhaul network, wherein the neighboring relationship establishment method comprises:
   establishing a neighbor list for the first wireless relay, the neighbor list comprising at least one neighbor relay of the first wireless relay, signal quality of the neighbor relay detected by the first wireless relay meets a predetermined condition;
   establishing an interface between the first wireless relay and the neighbor relay,
   wherein the establishing the neighbor list for the first wireless relay comprises:
   detecting information about the signal quality of the neighbor relay around the first wireless relay through detecting a wireless signal; and
   transmitting the detected information about the signal quality of the neighbor relay to a network side node, and receiving the neighbor list for the first wireless relay transmitted from the network side node,
   wherein prior to establishing the neighbor list for the first wireless relay, the neighboring relationship establishment method further comprises:
   establishing, by the first wireless relay, an interface between the first wireless relay and the network side node,
   wherein the establishing, by the first wireless relay, the interface between the first wireless relay and the network side node comprises:
   transmitting, by the first wireless relay, a first connection request message to the network side node when a signal from the network side node has been detected by the first wireless relay, and receiving, by the first wireless relay, a first connection establishment message transmitted from the network side node to establish the interface between the first wireless relay and the network side node, the first connection request message carrying identification information for authenticating a relay identity of the first wireless relay; or
   receiving, by the first wireless relay, a second connection establishment message that is transmitted from the network side node and forwarded by a third wireless relay, to establish the interface between the first wireless relay and the network side node.

2. The neighboring relationship establishment method according to claim 1, wherein prior to establishing the neighbor list for the first wireless relay, the neighboring relationship establishment method further comprises:
   establishing, by the first wireless relay, an interface between the first wireless relay and a second wireless relay.

3. The neighboring relationship establishment method according to claim 2, wherein the establishing, by the first wireless relay, the interface between the first wireless relay and the second wireless relay comprises:
   receiving, by the first wireless relay, a third connection establishment message transmitted from the second wireless relay, to establish the interface between the first wireless relay and the second wireless relay.

4. The neighboring relationship establishment method according to claim 1, wherein prior to receiving the second connection establishment message, the neighboring relationship establishment method further comprises:
   transmitting, by the first wireless relay, a second connection request message to the third wireless relay when a signal from the third wireless relay has been detected by the first wireless relay, and the second connection request message carrying the identification information for authenticating the relay identity of the first wireless relay.

5. A neighboring relationship establishment method for a network side node in a wireless backhaul network, wherein the neighboring relationship establishment method comprises:
   receiving, by the network side node, a first connection request message transmitted from a first wireless relay, the first connection request message carrying identification information for authenticating a relay identity of the first wireless relay;
   after the relay identity of the first wireless relay has been authenticated successfully, transmitting a first connection establishment message to the first wireless relay, to establish an interface between the network side node and the first wireless relay,
   wherein subsequent to establishing the interface between the network side node and the first wireless relay, the neighboring relationship establishment method further comprises:
   receiving information about signal quality of wireless relays detected by the first wireless relay, selecting a neighbor relay whose signal quality meets a predetermined condition from neighbor relays detected by the first wireless relay to acquire a neighbor list for the first wireless relay, and transmitting the neighbor list to the first wireless relay,
   wherein subsequent to establishing the interface between the network side node and the first wireless relay, the neighboring relationship establishment method further comprises:
   receiving, by the network side node, a second connection request message forwarded by the first wireless relay, the second connection request message carrying identification information for authenticating a relay identity of a second wireless relay;
   after the relay identity of the second wireless relay has been authenticated successfully, transmitting a second connection establishment message to the second wireless relay through the first wireless relay, to establish an interface between the network side node and the second wireless relay; or indicating the first wireless relay to establish an interface between the first wireless relay and the second wireless relay.

6. The neighboring relationship establishment method according to claim 5, further comprising:
   establishing and maintaining at least one path from the network side node to each wireless relay in accordance with the neighbor list of the neighbor relays.

7. A network side node in a wireless backhaul network, comprising a processor, a memory, and a computer program stored in the memory and capable of being executed by the processor, wherein the processor is used to execute the computer program to implement steps of the neighboring relationship establishment method according to claim 5.

8. The network side node according to claim 7, wherein the processor is further used to execute the computer program to implement a step of:
   establishing and maintaining at least one path from the network side node to each wireless relay in accordance with the neighbor list of the neighbor relays.

9. A first wireless relay in a wireless backhaul network, comprising a processor, a memory, and a computer program stored in the memory and capable of being executed by the processor, wherein the processor is used to execute the computer program to implement steps of a neighboring relationship establishment method comprising:
   establishing a neighbor list for the first wireless relay, the neighbor list comprising at least one neighbor relay of the first wireless relay, signal quality of the neighbor relay detected by the first wireless relay meets a predetermined condition;
   establishing an interface between the first wireless relay and the neighbor relay,
   wherein the establishing the neighbor list for the first wireless relay comprises:
   detecting information about the signal quality of the neighbor relay around the first wireless relay through detecting a wireless signal; and
   transmitting the detected information about the signal quality of the neighbor relay to a network side node, and receiving the neighbor list for the first wireless relay transmitted from the network side node,
   wherein the processor is further used to execute the computer program to implement a step of: prior to establishing the neighbor list for the first wireless relay,
   establishing, by the first wireless relay, an interface between the first wireless relay and the network side node,
   wherein the establishing, by the first wireless relay, the interface between the first wireless relay and the network side node comprises:
   transmitting, by the first wireless relay, a first connection request message to the network side node when a signal from the network side node has been detected by the first wireless relay, and receiving, by the first wireless relay, a first connection establishment message transmitted from the network side node to establish the interface between the first wireless relay and the network side node, the first connection request message carrying identification information for authenticating a relay identity of the first wireless relay; or
   receiving, by the first wireless relay, a second connection establishment message that is transmitted from the network side node and forwarded by a third wireless relay, to establish the interface between the first wireless relay and the network side node.

10. The first wireless relay according to claim 9, wherein the processor is further used to execute the computer program to implement a step of: prior to establishing the neighbor list for the first wireless relay,
   establishing an interface between the first wireless relay and a second wireless relay.

11. The first wireless relay according to claim 10, wherein the establishing the interface between the first wireless relay and the second wireless relay comprises:
   receiving a third connection establishment message transmitted from the second wireless relay, to establish the interface between the first wireless relay and the second wireless relay.

12. The first wireless relay according to claim 9, wherein the processor is further used to execute the computer program to implement a step of: prior to receiving the second connection establishment message,
   transmitting a second connection request message to the third wireless relay when a signal from the third wireless relay has been detected by the first wireless relay, and the second connection request message carrying the identification information for authenticating the relay identity of the first wireless relay.

* * * * *